W. B. PATON.
BOX COVERING MACHINE.
APPLICATION FILED JUNE 4, 1909.
965,738.
Patented July 26, 1910.
2 SHEETS—SHEET 1.
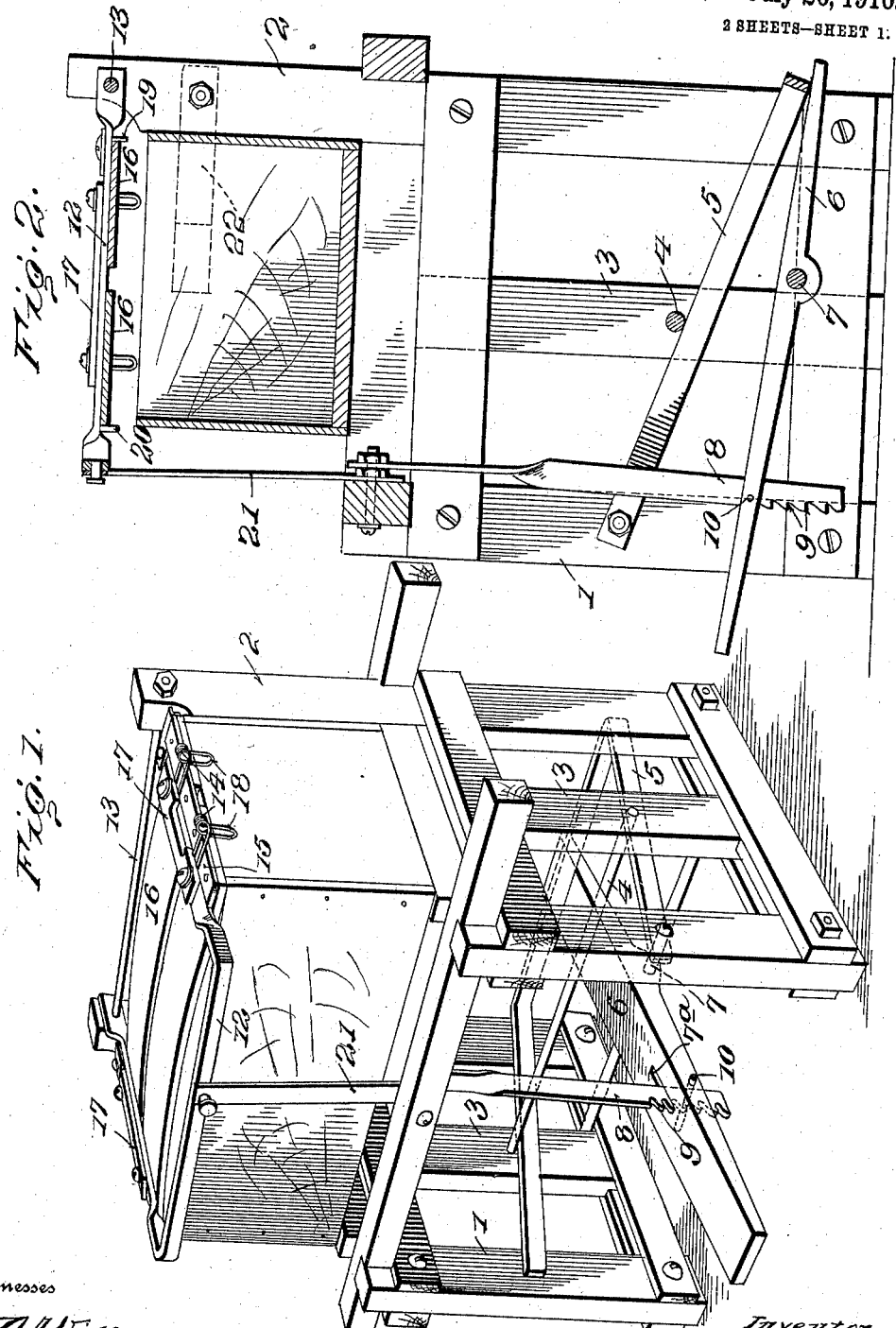

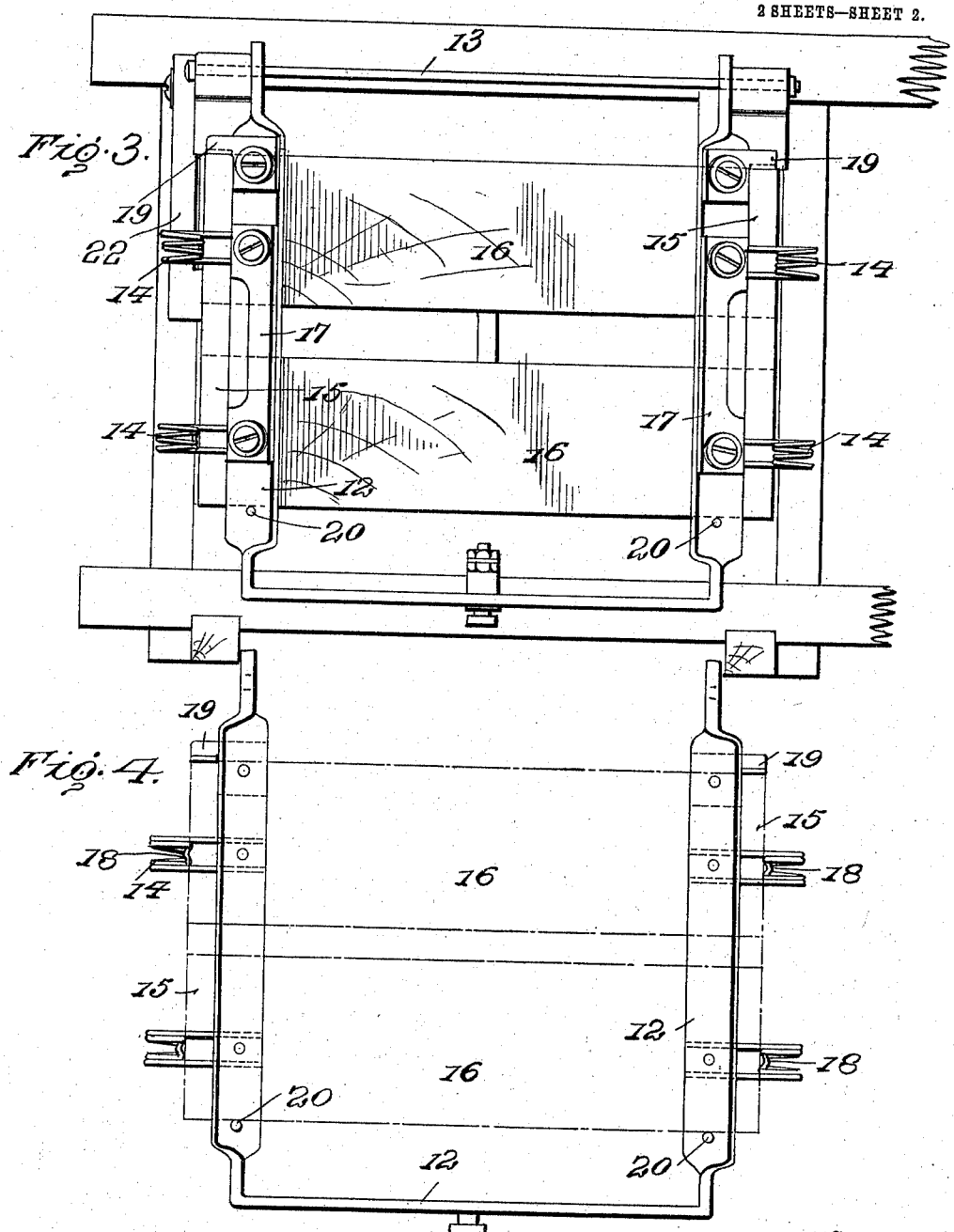

UNITED STATES PATENT OFFICE.

WILLIAM B. PATON, OF CASHMERE, WASHINGTON.

BOX-COVERING MACHINE.

965,738.    Specification of Letters Patent.    Patented July 26, 1910.

Application filed June 4, 1909.   Serial No. 500,195.

*To all whom it may concern:*

Be it known that I, WILLIAM B. PATON, of Cashmere, in the county of Chelan and State of Washington, have invented certain new and useful Improvements in Box-Covering Machines; and I do hereby declare the following to be a full, clear, and exact description of the invention, such as will enable others skilled in the art to which it appertains to make and use the same.

In the use of machines for facilitating the nailing of tops or covers on fruit boxes packers have been seriously annoyed by the bruising of the fruit in moving the boards of the cover to aline the edges thereof with the sides of the box.

The object of my invention is to overcome this difficulty by improved means for bringing the cover into perfect engagement with the top of a box and to hold the same in such position while it is nailed in place.

The invention will be hereinafter fully set forth and particularly pointed out in the claims.

In the accompanying drawings, Figure 1 is a view in perspective. Fig. 2 is a transverse sectional view. Fig. 3 is a top plan view of the cover retaining frame, and Fig. 4 a bottom plan view thereof.

Referring to the drawings, 1 designates a frame having corresponding side members, and upward extensions 2 at the rear. Within this frame is mounted a vertically movable platform which consists of two corresponding side members 3 of T-shape, the vertical portions of which are fitted in guideways of frame 1. These vertical portions are connected by a cross rod 4 which latter is designed to be engaged on its underside by a U-shape bail 5 the sides of which are pivoted at their forward ends to the front uprights of frame 1. The connecting portion of this bail rests upon a foot lever 6 fulcrumed on a cross rod 7 and located centrally between the sides of the frame. By bearing downwardly on the front end of lever 6 bail 5 will be raised at its rear end and by engaging cross rod 4 will effect the elevation of the platform upon which latter a fruit box is designed to be placed. Lever 6 is formed with a slot 7ª to accommodate a retaining latch 8 depending from a cross bar of frame 1 and formed in its front edge with teeth 9 which are designed to engage a pin 10 so as to hold lever 6 depressed and thereby retain the platform in its raised position.

12 designates the cover-retaining frame which is of U-shape in plan view. The free ends of its side members are pivoted on a cross rod 13 supported by extensions 2 of frame 1. These side members carry a series of spring fasteners 14 for retaining cleats 15 and boards 16 of a cover in place. These fasteners are shown as secured by plates 17 to the outer faces of the side members and as having downwardly extending portions 18 which will exert sufficient tension upon the cleats and boards to hold the same securely to the frame. On the underside of the latter are guiding stops 19 and 20, the former being beyond the side members so as to act as guides for positioning the cleats and boards. The downwardly bent portions 18 of the retainers hold the cleats against the longitudinal edges of the sides of the frame and also retain the cover boards. The cleats are first secured in place and thereafter the cover boards are positioned. These cleats as well as the ends of the boards which project thereover are outside the planes of the side members of the retaining frames so as to permit the cleats and boards to be readily nailed to the ends of the box. The cover retaining frame is locked in its normal position by a latch 21 pivoted to a cross bar of frame 1 and engaging a projection of said frame.

In practice, a box to be covered is placed upon the members of platform 3, being guided by the uprights 2 and an end stop 22 projecting therefrom, and thereupon the cleats and cover boards are secured in place on the retaining frame and the latter is lowered across the box and held by latch 21, whereupon the operator presses downwardly on lever 6 until the box is held securely against the ends of the cover boards, and then lever 6 is locked by latch 8 and with the parts in this position the operator can readily nail the cleats and boards to the box. It will be noted that the cleat and board retainers are sufficiently far apart to enable the cleats to be nailed without interference. Convenience in this respect is added to by the fact that the cleats are laterally beyond the sides of the retaining frame. After the cover has been applied the operator releases lever 6 from latch 8 and likewise disengages the cover retaining frame and raises the same so as to permit the covered box to be removed.

I claim as my invention:

1. In a box covering machine, a main frame, a vertically movable platform for a box, means for holding such platform in its raised position, a cover-retaining frame mounted above said platform and means for locking said cover retaining frame to the main frame.

2. In a box covering machine, a main frame, a vertically movable platform for a box, a cover-retaining frame pivoted to said main frame and extended horizontally above said platform, means for locking said cover-retaining frame to the main frame, and means for locking said platform in its raised position.

3. In a box covering machine, a cover-retaining frame having corresponding side members, and means mounted on said side bars extending laterally therefrom for supporting the ends of the cover boards and cleats therefor at points outside the planes of said side members.

4. In a box covering machine, a cover-retaining frame having corresponding side members, and spring fasteners projecting laterally from said side members for holding the ends of cover boards and cleats therefor at points outside the planes of said side members.

5. In a box covering machine, a main frame, a vertically movable platform, means for holding the same in its raised position, a cover-retaining frame pivoted on the rear portion of said main frame and designed to extend over said platform, means for locking the free end of said cover-retaining frame to said main frame, and means for retaining the cover boards and cleats therefor on said retaining frame.

6. The combination with a main frame and a vertically movable platform for a box, of means for holding the latter in its raised position, a cover retaining frame pivoted to said main frame and designed to extend over said platform, said cover retaining frame having means extending beyond the sides thereof for securing and holding the ends of cover boards and cleats therefor, and a retaining latch for said frame secured to said main frame.

7. In a fruit-box press, a frame to support the box, cover-board holding members adapted to yield to accommodate boards of slightly varying lengths, and means for relatively moving the holding members and the box-supporting frame toward each other.

8. In a fruit-box press, a frame to support the box, resilient cover-board holding members adapted to yield to accommodate boards of slightly varying lengths, and means for relatively moving the holding members and the box-supporting frame toward each other.

In testimony whereof, I have signed this specification in the presence of two subscribing witnesses.

WILLIAM B. PATON.

Witnesses:
N. R. CADE,
H. R. MILLS.